United States Patent [19]

Huang

[11] 4,109,395
[45] Aug. 29, 1978

[54] GREENHOUSE, DRYING, STORING NURSERY SYSTEM

[76] Inventor: Barney K. Huang, 2008 Varnell Ave., Raleigh, N.C. 27612

[21] Appl. No.: 736,533

[22] Filed: Oct. 28, 1976

[51] Int. Cl.² ............... F26B 19/00; F24J 3/02
[52] U.S. Cl. ........................... 34/93; 34/131; 34/219; 126/270; 47/65; 432/500
[58] Field of Search ............ 34/93, 191, 108, 109, 34/219, 133, 131, 139, 134, 232, 233, 235; 126/270; 237/1 A; 98/31, 32; 47/65; 432/500

[56] References Cited

U.S. PATENT DOCUMENTS

| 2,081,098 | 5/1937 | Steel | 34/191 |
|---|---|---|---|
| 2,837,321 | 6/1958 | Gleason | 34/108 |
| 3,673,825 | 7/1972 | Schuierer | 34/139 |
| 3,866,334 | 2/1975 | Huang | 34/93 |

FOREIGN PATENT DOCUMENTS 463,439  6/1975  U.S.S.R. ...................... 34/93

Primary Examiner—Kenneth W. Sprague
Assistant Examiner—James C. Yeung
Attorney, Agent, or Firm—Mills & Coats

[57] ABSTRACT

This invention relates to a greenhouse, drying, storing and nursery system and entails a simple multi-purpose structure which includes the capability to effectively utilize solar energy within a greenhouse and is adapted to control temperature, humidity and other environmental parameters. The multi-purpose structure may be utilized as a drying structure wherein a crop material or some other suitable product may be placed within the greenhouse-drying structure and a curing and/or drying effect may be realized by passing a system of air through the product or material disposed therein. As a part of the curing and/or drying system, the device of the present invention is adapted to circulate a system of air through the structure and to effectively collect solar energy when available for use during the curing or drying period. In addition, the multi-purpose structure is, of course, provided with an auxiliary heating unit in order to maintain and control the temperature within the drying structure at a desired temperature when there is insufficient solar energy available. It should be noted that the structure of the present invention has the additional capability to store energy, and to store grain or other commodity, and in the greenhouse application is adapted to support and grow plants or horticultural crops.

6 Claims, 4 Drawing Figures

GREENHOUSE, DRYING, STORING NURSERY SYSTEM

This invention relates to a multi-purpose structure adapted to be utilized as a greenhouse, crop or commodity drier, or as a storage facility for storing crops, commodities and any other desirable product.

BACKGROUND OF THE INVENTION

Today it is well known to dry crops in a structural facility of the type including a forced air furnace system for continuously forcing heated air through the crop or product being dried to achieve crop drying. But today most conventional crop driers are not fully utilized year around. In addition, the efficiency of many conventional driers today is not optimum. The net result of this is that the structure is expensive and very costly to operate at these low efficiencies and in view of the lack of full year around utilization. In addition, often one finds such crop driers are not designed to take into account the scarcity of fuel and labor that exist at many places of use.

In the field of agriculture, it is apparent that in almost all areas thereof that there exists a very progressive movement towards full mechanization. In viewing full mechanization, one must always concern himself with the beginning stages of crop production, namely, that phase of crop production that generally relates to planting seeds or transplanting. There is substantial research work being done today in the area of transplanting. It is well appreciated by those skilled in this art that to produce a good crop and to be able to provide a complete and successful transplanting operation that it is very desirable to grow plants that are uniform in size and which are free of disease. This is one of the principal holdbacks today in transplanting operations and is one of the principal reasons why many farmers have not been able to go to a fully automatic transplanter.

SUMMARY OF THE INVENTION

In view of the above, the present invention has been devised and presents a multi-purpose structure that is adapted to be utilized as a crop or product drier, a storage structure for storing such products or crops, or as a nursery facility for growing plant seedlings or other types of horticultural crops. As utilized, the multi-purpose structure of the present invention has the advantage of utilizing available solar energy in crop and product drying and in operation as a greenhouse.

Briefly, in use as a greenhouse, the multi-purpose structure of the present invention includes temperature, humidity and other environmental control features that allow one to maintain precise environmental control within the greenhouse while the same is being used to grow plant seedlings or other horticultural crops. In the drying mode of operation, the multi-purpose structure of the present invention is adapted to collect and utilize available solar energy in the curing and/or drying process being carried on, thereby increasing the efficiency of the drying structure and in turn reducing the cost of curing and/or drying the particular crop or product. As a drying structure, the structure of the present invention includes means for continuously circulating a system of air through the structure and through the crop material or product being dried, and includes an auxiliary heating means in order that the temperature within the structure when used as a drier can be controlled. Finally, the structure has the additional utility of a storage facility and as such may be used to store grain, other crop commodities, and any other product desired.

It is, therefore, an object of the present invention to provide a multi-purpose structure that may be utilized as either a drier, greenhouse, or storage facility.

A futher object of the present invention is to provide a multi-purpose structure in accordance with the immediate above object that has the capability to collect and utilize solar energy in the drying mode of operations as well as when used as a greenhouse.

Other objects and advantages of the present invention will become apparent from a study of the following description and the accompanying drawings which are merely illustrative of the present invention.

DESCRIPTION OF THE PREFERRED EMBODIMENT

Figure 1:
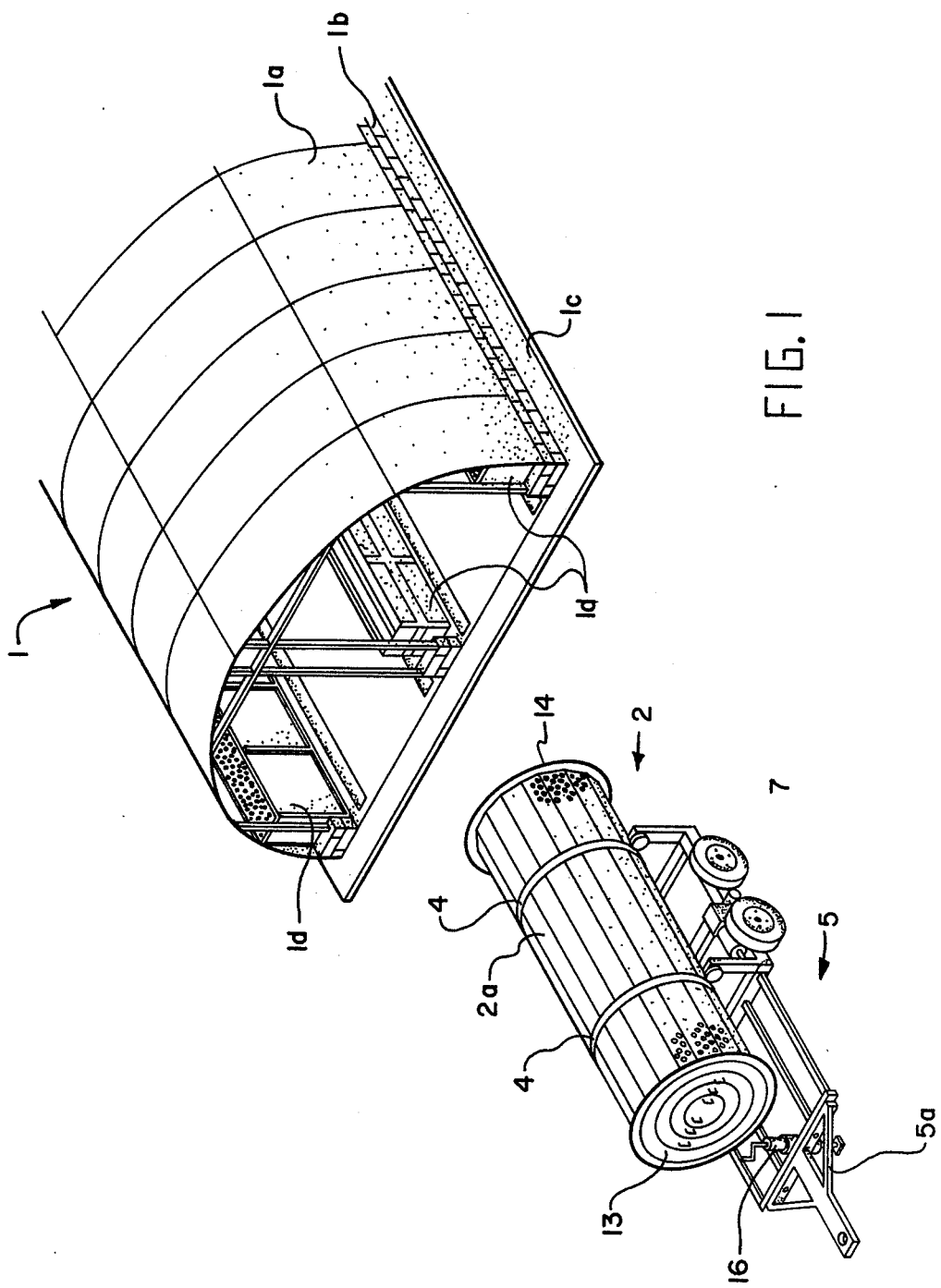
FIG. 1 is a perspective view of the multi-purpose structure of the present invention, particularly illustrating a trailer supported rotary driven elongated structure disposed outside the multi-purpose structure.
Figure 2:
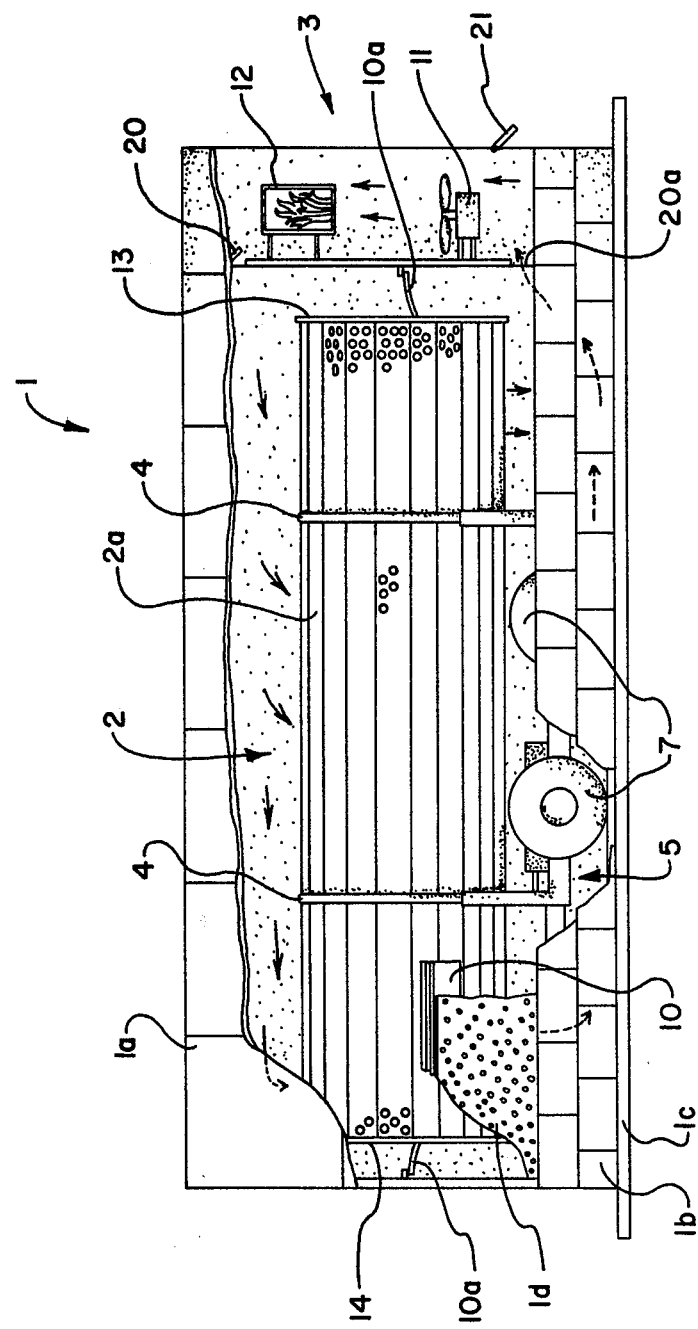
FIG. 2 is a side elevational view of the multi-purpose structure shown in FIG. 1.

With further reference to the drawings, the multi-purpose structure of the present invention is shown in FIGS. 1–4, and indicated generally therein by the numeral 1. The multi-purpose structure is of a basic greenhouse design in that the outer structural walls and roof is of a Quonset design and comprises a transparent housing material 1a such as fiberglass that allows available solar radiation to be transmitted therethrough into the interior thereof. Structure 1 may include a basic frame structure or be supported by a foundation 1b and concrete slab 1 or the like, and would be provided with front doors about the front end thereof. In addition, gravel energy storage units 1d may be provided. In the embodiment shown in FIGS. 1–4, structure 1 is of a width sufficient to form two bays. The size of the structure, of course, could be varied to suit particular needs. Disposed about the rear end of structure 1 is a furnace room that includes a burner 12 and an adjacently disposed fan and reversible electric motor 11 adapted to move a system of air through the structure 1 and pass the burner 12 in a generally circulating fashion. In the present case at daytime operation, air is circulated in a generally counterclockwise fashion with respect to FIG. 2. That is, air is moved vertically through the furnace room 3 where the air exists into the top area of the drying structure, and the air therefrom moves downwardly through the structure and through the rotors 2 and the material being dried, and therefrom back to the furnace room 3 or exhausted out from exhaust damper. While discussing the furnace room 3, it should be pointed out that the same includes a rearward air inlet damper 21 for allowing outside air to enter into the furnace room 3. In addition disposed generally about the top inside wall area of the furnace room 3 is a damper 20 that allows air to move from the furnace room 3 into a drying chamber defined underneath the structure 1. By the provision of an opening or damper 20a, air may return from the drying chamber back to the furnace room 3 in a circulating fashion, as shown in FIG. 2. To provide for exhaust, structure 1 is provided with exhaust dampers (not shown) that are approximately disposed about the lower side areas of the structure or the front of the structure, or any other suitable area of the structure.

Operating in conjunction with the multi-purpose structure 1 is one or more rotors or rotary structures, each indicated generally by the numeral 2. Viewing one rotor or rotary structure 2 in detail, it is seen that the same when disposed in the grain drying mode (FIG. 3) includes a generally cylindrical housing 2a, and front and rear end plates 13 and 14 in which at least the front end plate 13 is removable. Circumferentially disposed about the cylindrical housing of the rotary structure 2 is a pair of axially spaced drive tracks 4, each drive track being aligned with a pair of rotors 6 and 6a, at least one of the rotors of the group shown being driven by any conventional drive such as an electric motor and combination reduction drive unit. It is seen that each of the drive tracks 4 pass into engagement with two respective aligned rotors 6 and 6a. The driving torque supplied to the rotor 6 and/or 6a is transmitted to respective drive tracks, resulting in the rotor structure rotating about its axis. The rotors 6 and 6a are supported on a mobile support frame or trailer 5 that includes a plurality of wheels 7 and a leveling jack 16. Trailer 5 is preferably provided with a detachable front tongue assembly 5a in order that the same can be connected and disconnected to the main frame of the trailer 5.

With respect to the cylindrical housing 2a of the rotary structure 2, it is seen that the same comprises a plurality of circumferentially disposed perforated plates 8, the plates 8 being pivotably mounted about the cylindrical wall area of the rotary structure. In the grain drying mode shown in FIG. 3, the respective perforated plates are secured about the cylindrical outer surface of the rotary structure 2 so as to define a grain or crop receiving enclosure interiorly within the rotary structure. In this grain drying mode, the respective sides of the plates 8 are oriented and extend so as to generally close the cylindrical wall portion of the rotary structure 2 in order that the same may contain and support grain or other types of products therein. Because the rotary structure 2 is adapted to support grain and in the grain drying process so as to allow air to move therethrough, the plates 8 are perforated to allow air to move therethrough. In addition, to gain the advantages of solar energy, the perforated plates 8 are generally painted or treated so as to be as close to thermally black as reasonably possible in order to serve as a heat collector.

Figure 3:
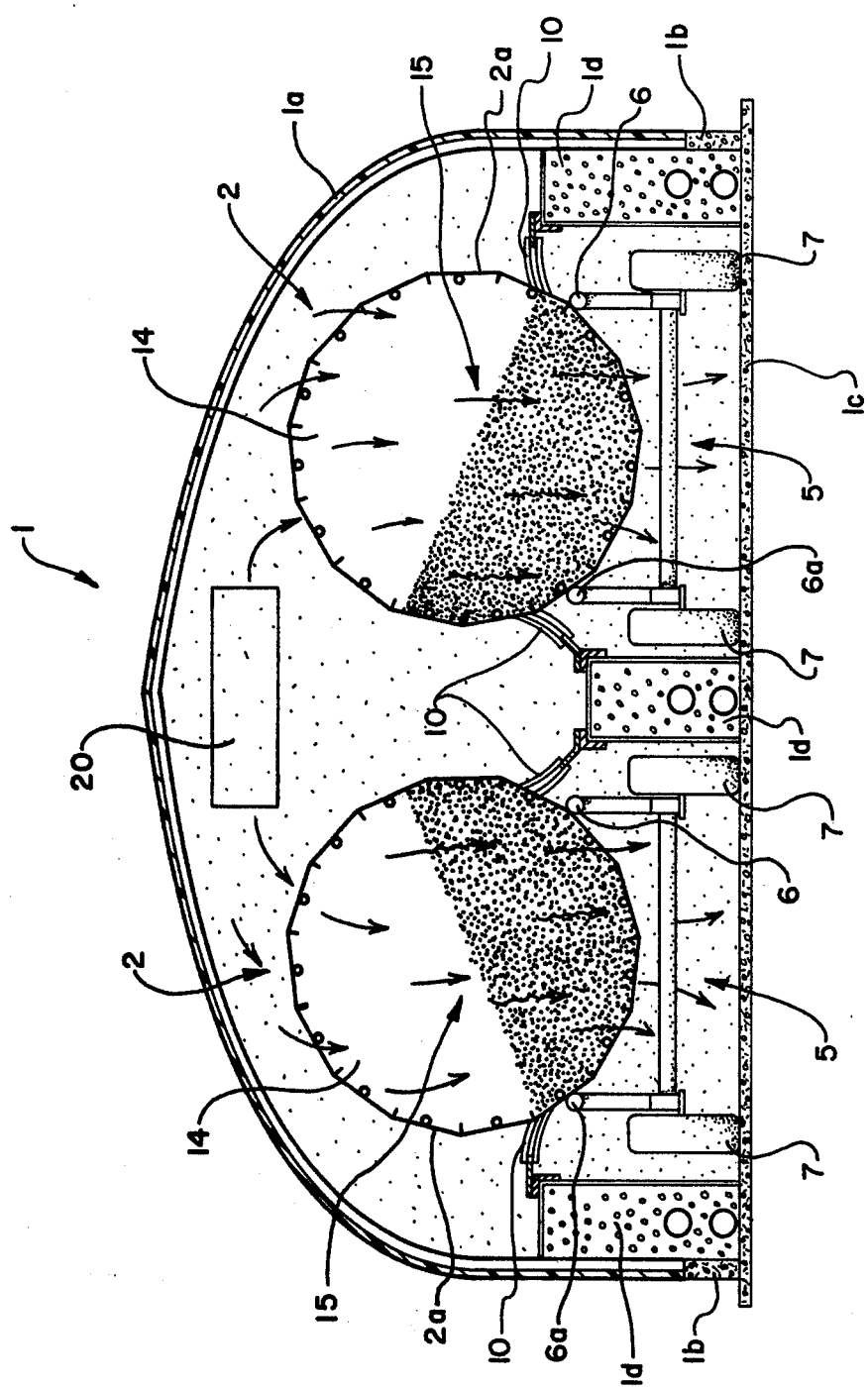
FIG. 3 is a cross sectional view of the multi-purpose structure of the present invention illustrating the structure and the rotary inner structures thereof being utilized in a grain drying mode of operation.

In the greenhouse operation, the perforated plates 8 are released from the normal locked position that the same assume in FIG. 3 to where the plates will freely swing about support pivots 9 and will be maintained in a generally horizontal level position as each rotor 2 is rotated. These perforated plates 8 serve to support plant trays or the like and because the rotary structure 2 can be driven the plants being supported about the plate 8 will be continuously exposed to available sunlight. This has the advantage of assuring sunlight exposure to all the plants supported by the rotary structure in the greenhouse operation and maximum utilization of greenhouse space. This, of course, is to be contrasted with a layer growth operation.

In the grain drying operation during daytime, air is generally forced from the top of the structure 1 downwardly through the cylindrical wall structure of each rotary 2, on through the grain or other crop or product being dried therein, after which the air may be exhausted or returned to the furnace room through damper 20a and continued to be recirculated during the curing and/or drying process being carried out. As seen in FIG. 3, the rotors 2 includes a volume of material being dried and this material is referred to by the numeral 15 and may be of any crop or product that is suitable for drying such as peanuts, corn, fruits, tea leaves or vegetables or the like. It is appreciated that to effectuate drying that it is necessary to constrain and force substantially all of the air through the rotors 2 and the crop or product disposed therein. Therefore, to accomplish this, the present invention is provided with means to seal the space between the outer walls of the structure 1 and the rotors. This is accomplished by the provision of side seals 10 and end seals 10a that are of a generally resilient quality in order that the inner terminal edge may be maintained in continuous contact with the outer cylindrical wall structure or end plates of the rotors as the same are rotated. The seals 10 and 10a may be biased for sealing engagement with the rotary structures 2 by springs or the like.

The rotors are slowly rotated during the drying process to provide gentle agitation of the materials to be dried to assure uniform drying. The perforated rotor surface 2a serves as a continuous heat absorber and effective heat transfer by air passing through perforation. During nighttime operation, the air flow direction is reversed with reversible fan 20 so that drying air passes through opening 20a to lower drying chamber, through perforations formed about rotors 2 and the drying materials therein, and into the upper chamber. As the warm moist air contacts the inner surface of outer shell 1a which is cooled by night temperature the moisture will be condensed at the inner surface and will drain towards outer lower areas of the shell structure by gravity. Dehydrated air will then return to furnace room 3 through damper 20, to be recirculated. Thus, the structure is effectively utilized as a heat exchanger during nighttime or when solar energy is not available. The rotors can be tilted with respect to the trailer wheel shaft to facilitate filling or removal of drying materials thus simplifying mechanical handling of materials by simply rotating the rotors to inclined positions.

In the greenhouse operation where plant seedlings or other types of horticultural crops are grown, these seals 10 may be moved to an inoperative position or simply removed. In addition, as pointed out above, the plates 8 are unlatched and allowed to free swing in a normal horizontal position. The rotor is rotated slowly to provide uniform exposure of plants to sunlight. The same temperature and air circulation and solar energy storage devices can be used effectively for optimum environmental control for maximum plant production. The perforated plates 8 when used in conjunction with seedling growing and handling devices (U.S. Pat. No. 3,712,252) will effectively provide air pruning effect of seedling roots for maximum growth after transplanting.

Figure 4:
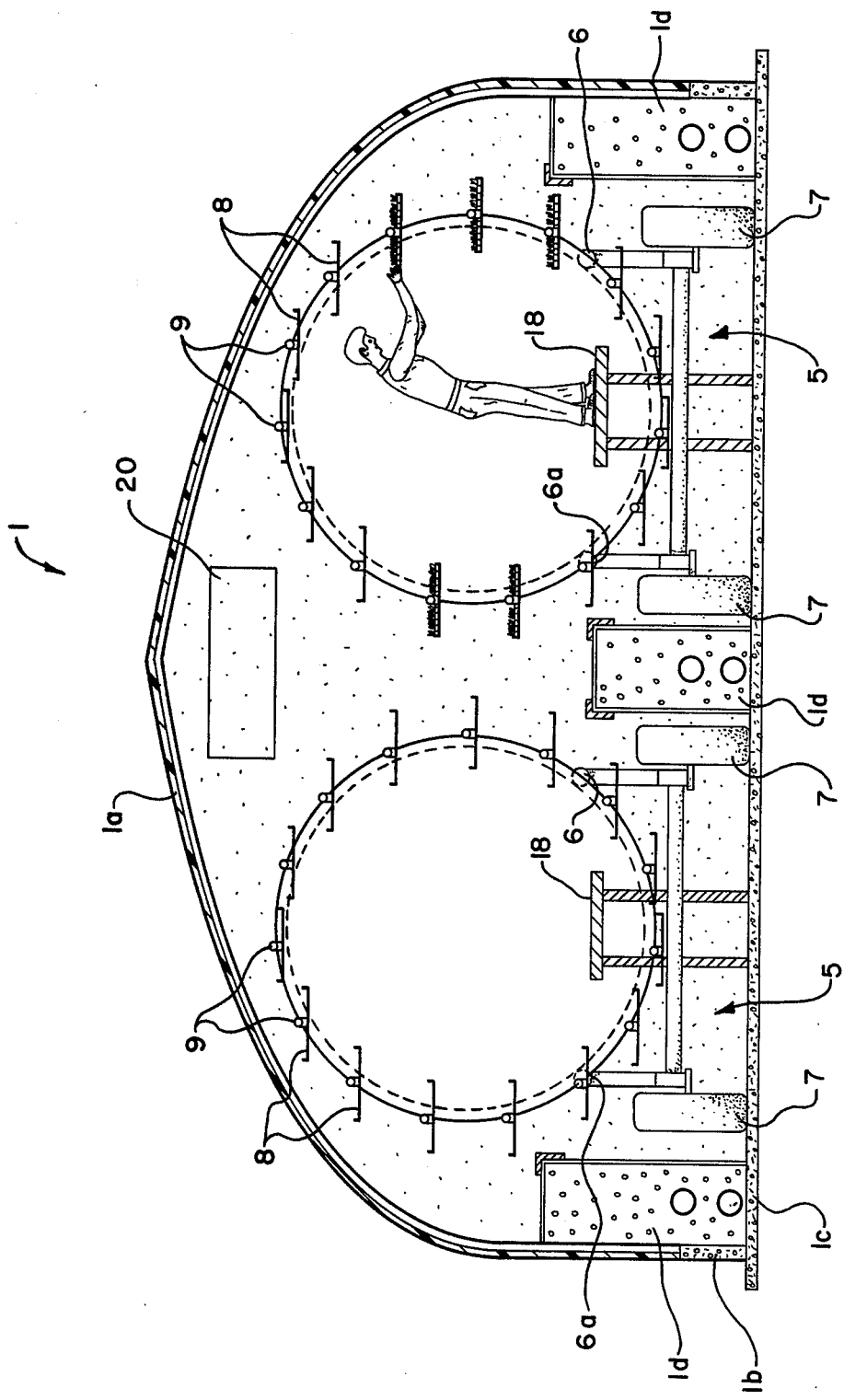
FIG. 4 is a cross sectional view of the multi-purpose structure of the present invention illustrating two rotary driven inner structures disposed in the greenhouse operating mode.

In order to provide for convenient access when the rotors are in the greenhouse mode of operation, the present invention contemplates the placement of an inner walkway or bridge 18 that would extend through the rotor structure 2 from front to rear and be supported about respective ends from the lower part of the multi-purpose structure 1, as seen in FIG. 4.

In the storing mode the rotors filled with dried material can be pulled outside to a shed or covered for storage without loss to rodents or insects. The greenhouse structure can then be used as conventional greenhouse operation.

Details of the furnace and auxiliary supporting features for the greenhouse such as watering systems and the like have not been dealt with herein in detail because they are not per se a part of the invention such features and devices are well known in the art and appreciated by those skilled in the art. It will be understood that known and conventional controls and features for crop driers and driers in general can be utilized in conjunction with the present invention as desired. The same applies to conventional and known features of a greenhouse or other type of plant growing structure.

The terms "upper", "lower", "forward", "rearward", etc., have been used herein merely for the convenience of the foregoing specification and in the appended Claims to describe the greenhouse drying, storing nursery system and its parts as oriented in the drawings. It is to be understood, however, that these terms are in no way limting to the invention since the greenhouse drying storing nursery system may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A multi-purpose structure adapted for use as a drier or greenhouse comprising: a main outer structural housing including a transparent outer surface for allowing available solar radiation to be transmitted through said outer structural housing; at least one rotor structure normally disposed interiorly of said main outer structural housing and exposed to available solar radiation transmitted through said outer structural housing, said rotor structure when used in a drying mode of operation including a cylindrifal wall structure that has the capability to support and hold material; support means normally disposed interiorly of said outer structural housing for supporting said rotor structure interiorly of said outer structural housing, said support means including a portable like trailer having wheel means for allowing said trailer to be moved in and out of said structure; rotor drive means operatively associated with said rotor structure for rotatively driving the same, and a furnace system operatively associated with said multi-purpose structure for circulating air through the interior of said structure and including heating means for heating the air as necessary in order to maintain a desired temperature level within said structure.

2. The multi-purpose structure of claim 1 wherein said rotor structure includes a plurality of perforated plates disposed about the outer areas thereof, each plate being pivotably mounted for movement between a first position where the plates form a generally cylindrical wall for effective solar heat collector and transfer and generally enclose the rotor structure such that grain and other products can be supported therein for drying, and a second position where said plates are maintained in a generally horizontal level position for supporting plants as the rotor is driven in approximate fashion in a greenhouse mode of operation.

3. The multi-purpose structure of claim 1 wherein said structure includes seal means disposed interiorly thereof and engageable with said rotary structure when the same is rotating for prohibiting air from moving pass the sides of said rotor structure when said multi-purpose structure is utilized as a drying facility.

4. The multi-purpose structure of claim 1 wherein said portable trailer includes roller means for receiving and supporting said roller structure thereabove, and wherein said rotor means is adapted to drive said rotor structure in a rotating fashion.

5. The multi-purpose structure of claim 4 wherein said rotor structure includes a cylindrical housing having at least one drive track circumferentially formed around said cylindrical wall structure, and wherein said rotary drive means supported on said portable like trailer is adapted to engage said drive track in order to drive and guide the rotor structure thereabove when used as either a drying facility or as a greenhouse.

6. The multi-purpose structure of claim 1 wherein said furnace system includes reversible fan means for circulating air in either of two basic air flow patterns within said structure, one air flow pattern used for daytime drying and one air flow pattern used for nighttime drying or periods where the net energy gained from solar energy is minimal.

* * * * *